(12) United States Patent
Brückner

(10) Patent No.: US 6,587,766 B2
(45) Date of Patent: Jul. 1, 2003

(54) METHOD FOR CONTROLLING THE POWER OF A FUEL CELL STACK, METHOD FOR CONTROLLING THE POWER OF A DRIVE UNIT OF AN ELECTRIC VEHICLE, AND FUEL CELL DEVICE

(75) Inventor: Dieter Brückner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 21 days.

(21) Appl. No.: 09/918,057

(22) Filed: Jul. 30, 2001

(65) Prior Publication Data

US 2002/0016684 A1 Feb. 7, 2002

Related U.S. Application Data

(63) Continuation of application No. PCT/DE00/00153, filed on Jan. 18, 2000.

(30) Foreign Application Priority Data

Jan. 28, 1999 (DE) .......................... 199 03 356
Mar. 9, 1999 (DE) .......................... 299 04 328

(51) Int. Cl.$^7$ ................................................ G06F 7/00
(52) U.S. Cl. ................................................ 701/22
(58) Field of Search ............................. 701/22; 429/12, 429/19, 28

(56) References Cited

U.S. PATENT DOCUMENTS

| 5,445,902 A | 8/1995 | Soma et al. | |
|---|---|---|---|
| 5,862,248 A | 1/1999 | Salatino et al. | |
| 5,925,476 A | 7/1999 | Kawatsu | |
| 6,087,028 A | * 7/2000 | Goto | 429/24 |
| 6,106,963 A | * 8/2000 | Nitta et al. | 429/19 |
| 6,165,633 A | * 12/2000 | Negishi | 429/17 |

FOREIGN PATENT DOCUMENTS

| DE | 29 41 514 C2 | 6/1988 |
|---|---|---|
| DE | 38 12 812 C1 | 10/1989 |
| DE | 42 01 795 A1 | 7/1993 |
| DE | 196 29 265 A1 | 1/1998 |
| DE | 690 31 901 T2 | 8/1998 |
| EP | 0 595 503 A1 | 5/1994 |
| EP | 0 828 303 A2 | 3/1998 |
| JP | 59154775 A | 9/1984 |
| JP | 04155769 A | 5/1992 |

* cited by examiner

*Primary Examiner*—Yonel Beaulieu
(74) *Attorney, Agent, or Firm*—Laurence A. Greenberg; Werner H. Stemer; Ralph E. Locher

(57) ABSTRACT

A method for controlling the power of a fuel cell stack measures the oxygen partial pressure in the process gas, for example in the exhaust air of the fuel cell stack. A mass flow rate of air to be supplied to the fuel cell stack is set accordingly. A method for controlling the power of a drive unit of an electric vehicle and a fuel cell device are also provided.

5 Claims, 1 Drawing Sheet

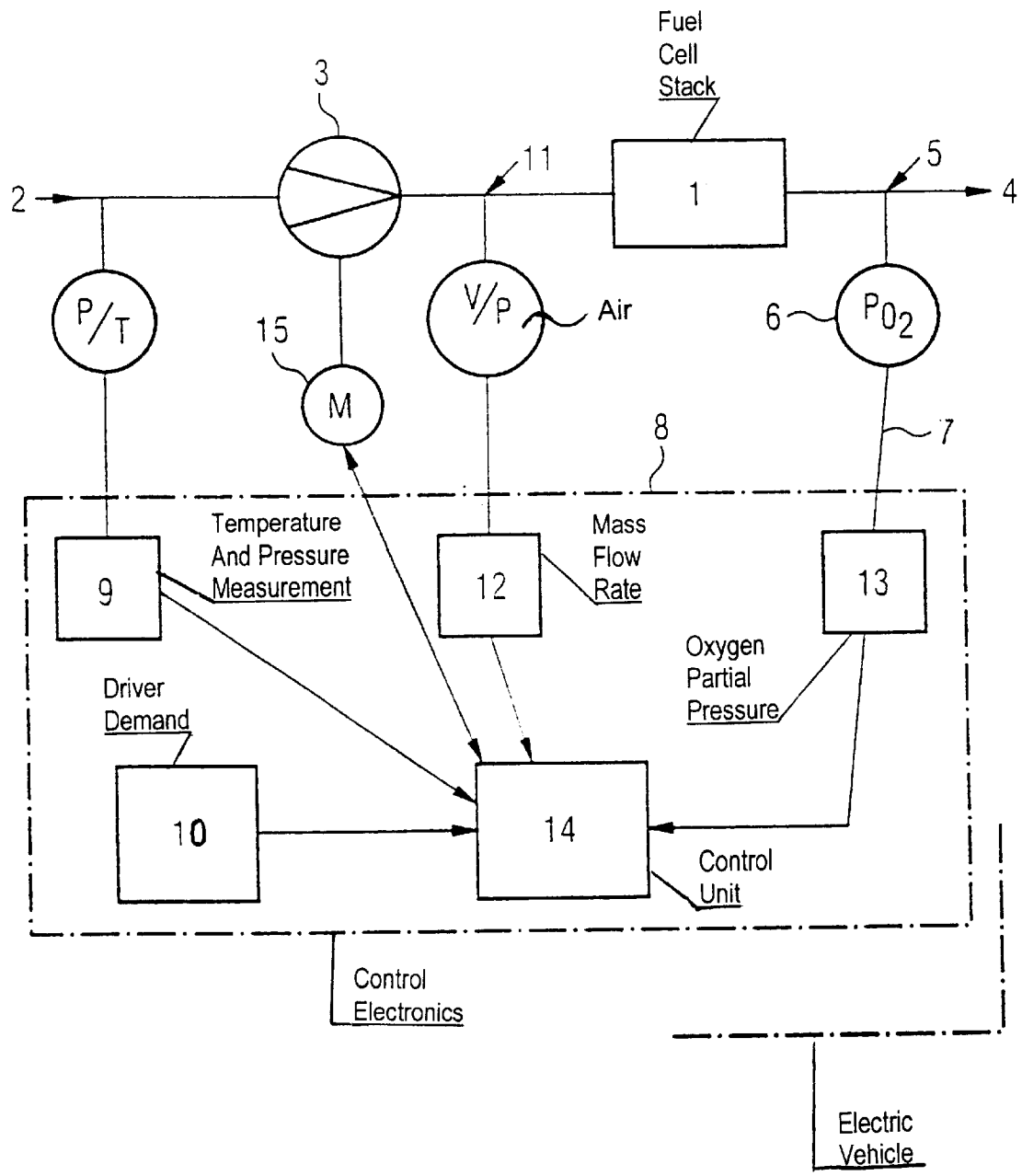

METHOD FOR CONTROLLING THE POWER OF A FUEL CELL STACK, METHOD FOR CONTROLLING THE POWER OF A DRIVE UNIT OF AN ELECTRIC VEHICLE, AND FUEL CELL DEVICE

CROSS-REFERENCE TO RELATED APPLICATION

This application is a continuation of copending International Application No. PCT/DE00/00153, filed Jan. 18, 2000, which designated the United States.

BACKGROUND OF THE INVENTION

Field of the Invention

The invention relates to a method for controlling the power of a fuel cell stack, a method for controlling the power of a drive unit of an electric vehicle, and a fuel cell device.

A system for controlling the power of a fuel cell stack in which the cell voltage of the last one of the fuel cells is adjusted according to given requirements is known. A drawback of this system is that the cell voltage of the majority of the fuel cells is not taken into account. Furthermore, it is known to control the power of the fuel cell by controlling the quantity of air supplied to the system. A drawback of this system is that not the reactant itself is adjusted, i.e. for example the oxygen, but rather the air is adjusted, which may contain varying concentrations of oxygen. This may give rise to the situation in which, despite the supply of air being restricted, the power output by the fuel cells remains unchanged since, coincidentally, the oxygen partial pressure of the air at the restriction point has risen simultaneously.

Published European Patent Application No. EP 0 828 303 A2, corresponding to U.S. Pat. No. 5,925,476, discloses a fuel-cell-operated generator system for current, in which fuel cell stacks which are supplied with process gas are used. In this system, in order to set a desired power and to determine a deviation from the set power, it is essentially checked whether the catalyst of the fuel cells has been poisoned. To do this, inter alia the temperature and the pressure of the process gases supplied are recorded and regulated. Furthermore, Published European Patent Application No. EP 0 595 503 A1, corresponding to U.S. Pat. No. 5,445,902, describes a method for operating a solid oxide fuel cell (SOFC) installation, in which the temperature management is substantially dependent on the conditions set.

SUMMARY OF THE INVENTION

It is accordingly an object of the invention to provide a method for controlling the power of a fuel cell stack, a method for controlling the power of a drive unit of an electric vehicle, and a fuel cell device which overcome the above-mentioned disadvantages of the heretofore-known methods and device of this general type.

With the foregoing and other objects in view there is provided, in accordance with the invention, a method for controlling a power of a fuel cell stack, the method includes the steps of:

supplying, via a feed line, fuel gas and air as process gases to a fuel cell stack;

measuring an oxygen partial pressure of a reaction gas in a cathode exhaust air;

comparing a set power with an actual power output by the fuel cell stack by correlating the oxygen partial pressure of the reaction gas with the actual power; and using the oxygen partial pressure in the cathode exhaust air as a reference variable for setting a process gas mass flow rate, and setting an air mass flow rate accordingly with a control unit.

In other words, a method for controlling the power of a fuel cell stack which is supplied with fuel gas and air as process gases via a feed line, the partial pressure of a reaction gas being measured and a set power being compared with the actual power output by the fuel cell stack as a result of the partial pressure of reaction gas, which is present in the process gas, being correlated with the power output and the quantity of process gas supplied being set according to the requirements, wherein the oxygen partial pressure in the cathode exhaust air is measured and serves as a reference variable for setting the mass flow rate of process gas to be supplied, the mass flow rate of air supplied being set accordingly by a control unit.

With the objects of the invention in view there is also provided, a fuel cell device, including:

a fuel cell stack;

a process gas line, connected to the fuel cell stack, for supplying fuel gas and air to the fuel cell stack;

a cathode exhaust-gas line connected to the fuel cell stack;

a probe, provided in the cathode exhaust-gas line, for measuring an oxygen partial pressure of a reaction gas in a cathode exhaust air; and a control unit, operatively connected to the probe, the control unit comparing a set power with an actual power output by the fuel cell stack by correlating the oxygen partial pressure of the reaction gas with the actual power, and the control unit using the oxygen partial pressure of the reaction gas in the cathode exhaust air as a reference variable for setting a process gas mass flow rate and for setting an air mass flow rate of the air to be supplied to the fuel cell stack.

According to another feature of the invention, data input units are operatively connected to the control unit, and at least one of the data input units is connected to the probe for measuring the oxygen partial pressure.

With the objects of the invention in view there is also provided, a method for controlling a power of a drive unit of an electric vehicle, the method includes the steps of:

supplying, via a feed line, fuel gas and air as process gases to a fuel cell stack of a drive unit of an electric vehicle;

measuring an oxygen partial pressure of a reaction gas in a cathode exhaust air;

comparing a set power with an actual power output by the drive unit by correlating the oxygen partial pressure of the reaction gas with the actual power; and using the oxygen partial pressure in the cathode exhaust air as a reference variable for setting a process gas mass flow rate and for setting an air mass flow rate accordingly with a control unit.

With the objects of the invention in view there is also provided, a method for controlling a power of a drive unit of an electric vehicle, the method includes the steps of:

supplying, via a feed line, fuel gas and air as process gases to a fuel cell stack of a drive unit of an electric vehicle;

operating the fuel cell stack with air as an oxidant;

measuring, with a probe provided in a cathode exhaust-gas line, an oxygen partial pressure of a reaction gas in a cathode exhaust air;

comparing, with a control unit, a set power with an actual power output by the drive unit by correlating the oxygen partial pressure of the reaction gas with the actual power, and using the oxygen partial pressure in the cathode exhaust air as a reference variable for setting a process gas mass flow rate, and setting an air mass flow rate accordingly with the control unit; and controlling a rotational speed of a motor for an air compressor for the fuel cell stack by taking into account, with the control unit, commands of a driver, data of an external-temperature measurement and an ambient pressure measurement, data concerning a mass flow rate of air currently supplied to the fuel cell stack, and data concerning the oxygen partial pressure in the cathode exhaust air.

The invention relates to a method for controlling the power of a fuel cell stack, in which the oxygen partial pressure in the cathode exhaust air is measured and serves as a reference variable for setting the mass flow rate of process gas to be supplied. In this method, through the use of a control unit the set power is compared with the actual power output by the fuel cell stack and the control unit takes into account the oxygen partial pressure which is still present in the exhaust gas when setting the air mass flow rate. In the associated device, the probe is provided in the cathode exhaust gas line for the purpose of measuring the oxygen partial pressure of the cathode exhaust air. The measured value is transmitted to the control unit and serves as a reference variable for setting the mass flow rate of air which is to be supplied to the fuel cell stack.

According to an advantageous configuration of the invention, further data, such as the ambient pressure and the outside temperature of the installation, is available to the electronic control unit and can be used to more accurately meter the mass flow rate of air to be supplied.

In the present case, the humidified and compressed gas/liquid mixture which is introduced into the fuel cell stack for conversion purposes is referred to as the process gas. One example of a process gas is humidified air, but the process gas may also be pure oxygen or pure hydrogen, as well as a water/methanol mixture. It is preferable to use air for the cathode-side process gas, the mass flow rate of which is set through the use of the electronic control unit.

The term reaction gas refers to the gas which is actively converted in the fuel cell. This is preferably pure oxygen, pure hydrogen or pure methanol, depending on the type of PEM (proton exchange membrane) fuel cell. The reaction gas has no inert gas and/or steam content. Therefore, the probe only measures the partial pressure of a gas in the gas/liquid mixture of the exhaust gas from the fuel cell.

Other features which are considered as characteristic for the invention are set forth in the appended claims.

Although the invention is illustrated and described herein as embodied in a method and a device for controlling the power of a fuel cell stack, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The single FIGURE is a block diagram of an exemplary embodiment of a drive unit in an electric vehicle according to the invention.

DESCRIPTION OF THE PREFERRED EMBODIMENTS

Referring now to the single FIGURE in detail, there is shown a drive unit of an electric vehicle, including a fuel cell stack 1 with a process-gas feedline 2, for example the oxidant feedline, in which the air mass flow is flowing. The process-gas feedline 2 leads through a compressor 3 before the process gas is passed into the fuel cell stack 1. Between the compressor 3 and the stack 1, at the location 11 of the process-gas feedline 2, the mass flow rate of process gas which is currently being supplied and which can be adjusted through the use of the control electronics 8, is measured. The exhaust-gas line 4 can be seen to the right of the fuel cell stack 1.

In the exhaust-gas line 4, the oxygen partial pressure ($P_{O2}$) is measured using a probe 6 at the location 5 which is located directly following the fuel cell stack 1. The probe 6 is connected to the control electronics 8 (indicated by a dash-dotted lines) via the line 7. The following information is brought together in the control electronics 8:

the driver's demands 10, the data from the outside temperature and ambient pressure measurement 9, which can easily be taken from the air feedline 2 upstream (P/T) of the compressor, the mass flow rate 12 of air which is currently being supplied and is measured (V/P) at the location 11 of the process-gas feedline 2, and the oxygen partial pressure 13 in the cathode exhaust air, which is measured at the location 5 using the probe 6.

The control unit 14 uses this information to calculate a correction value x which determines whether the supply of air should be increased or restricted. Then, the mass flow rate of air which is fed to the fuel cell stack 1 is regulated accordingly through the use of the compressor 3, the speed control 15 of the motor of the compressor is connected to the control unit 14.

Therefore, it is for the first time possible to effectively control, in a simple and direct manner, the power of a fuel cell stack which is operated, for example, with air by measuring the $O_2$ partial pressure.

The invention is in particular suited for a mobile use of the PEM fuel cell, in particular in automotive engineering, although stationary applications are also conceivable.

I claim:

1. A method for controlling a power of a fuel cell stack, the method which comprises:

supplying, via a feed line, fuel gas and air as process gases to a fuel cell stack;

measuring an oxygen partial pressure of a reaction gas in a cathode exhaust air;

comparing a set power with an actual power output by the fuel cell stack by correlating the oxygen partial pressure of the reaction gas with the actual power; and using the oxygen partial pressure in the cathode exhaust air as a reference variable for setting a process gas mass flow rate, and setting an air mass flow rate accordingly with a control unit.

2. A fuel cell device, comprising:

a fuel cell stack;

a process gas line, connected to said fuel cell stack, for supplying fuel gas and air to said fuel cell stack;

a cathode exhaust-gas line connected to said fuel cell stack;

a probe, provided in said cathode exhaust-gas line, for measuring an oxygen partial pressure of a reaction gas in a cathode exhaust air; and a control unit, operatively connected to said probe, said control unit comparing a set power with an actual power output by said fuel cell stack by correlating the oxygen partial pressure of the reaction gas with the actual power, and said control unit using the oxygen partial pressure of the reaction gas in the cathode exhaust air as a reference variable for setting a process gas mass flow rate and for setting an air mass flow rate of the air to be supplied to said fuel cell stack.

3. The fuel cell device according to claim 2, including data input units, operatively connected to said control unit, at least one of said data input units being connected to said probe for measuring the oxygen partial pressure.

4. A method for controlling a power of a drive unit of an electric vehicle, the method which comprises:

supplying, via a feed line, fuel gas and air as process gases to a fuel cell stack of a drive unit of an electric vehicle;

measuring an oxygen partial pressure of a reaction gas in a cathode exhaust air;

comparing a set power with an actual power output by said drive unit by correlating the oxygen partial pressure of the reaction gas with the actual power; and using the oxygen partial pressure in the cathode exhaust air as a reference variable for setting a process gas mass flow rate and for setting an air mass flow rate accordingly with a control unit.

5. A method for controlling a power of a drive unit of an electric vehicle, the method which comprises:

supplying, via a feed line, fuel gas and air as process gases to a fuel cell stack of a drive unit of an electric vehicle;

operating the fuel cell stack with air as an oxidant;

measuring, with a probe provided in a cathode exhaust-gas line, an oxygen partial pressure of a reaction gas in a cathode exhaust air;

comparing, with a control unit, a set power with an actual power output by said drive unit by correlating the oxygen partial pressure of the reaction gas with the actual power, and using the oxygen partial pressure in the cathode exhaust air as a reference variable for setting a process gas mass flow rate, and setting an air mass flow rate accordingly with the control unit; and controlling a rotational speed of a motor for an air compressor for the fuel cell stack by taking into account, with the control unit, commands of a driver, data of an external-temperature measurement and an ambient pressure measurement, data concerning a mass flow rate of air currently supplied to the fuel cell stack, and data concerning the oxygen partial pressure in the cathode exhaust air.

* * * * *